US012780972B2

(12) United States Patent
Fischer et al.

(10) Patent No.: US 12,780,972 B2
(45) Date of Patent: Nov. 3, 2026

(54) PHOTO- AND THERMALLY CURABLE RESIN USEFUL IN ADDITIVE MANUFACTURING PROCESSES

(71) Applicant: Stratasys, Inc., Eden Prairie, MN (US)

(72) Inventors: Anne Fischer, Cologne (DE); Thomas Buesgen, Leverkusen (DE); Dirk Achten, Leverkusen (DE); Jan Suetterlin, Cologne (DE)

(73) Assignee: Stratasys, Inc., Minnetonka, MN (US)

( * ) Notice: Subject to any disclaimer, the term of this patent is extended or adjusted under 35 U.S.C. 154(b) by 411 days.

(21) Appl. No.: 18/576,829

(22) PCT Filed: Jun. 30, 2022

(86) PCT No.: PCT/EP2022/068143
§ 371 (c)(1),
(2) Date: Jan. 5, 2024

(87) PCT Pub. No.: WO2023/280683
PCT Pub. Date: Jan. 12, 2023

(65) Prior Publication Data

US 2025/0002627 A1 Jan. 2, 2025

(30) Foreign Application Priority Data

Jul. 9, 2021 (EP) .................................... 21184735

(51) Int. Cl.

| | |
|---|---|
| ***C08L 75/04*** | (2006.01) |
| ***B29C 64/124*** | (2017.01) |
| ***B29C 71/02*** | (2006.01) |
| ***B33Y 10/00*** | (2015.01) |
| ***B33Y 40/20*** | (2020.01) |
| ***C08F 2/50*** | (2006.01) |
| ***C08F 283/00*** | (2006.01) |
| ***C08G 18/09*** | (2006.01) |
| ***C08G 18/79*** | (2006.01) |
| ***C08L 33/08*** | (2006.01) |
| ***C08L 33/10*** | (2006.01) |
| ***C08L 33/12*** | (2006.01) |
| *B29K 33/00* | (2006.01) |
| *B29K 75/00* | (2006.01) |

(52) U.S. Cl.
CPC .......... *C08F 283/00* (2013.01); *B29C 64/124* (2017.08); *B29C 71/02* (2013.01); *B33Y 10/00* (2014.12); *B33Y 40/20* (2020.01); *C08F 2/50* (2013.01); *C08G 18/092* (2013.01); *C08G 18/792* (2013.01); *B29K 2033/12* (2013.01); *B29K 2075/00* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 2003/0158322 A1 | 8/2003 | Rische et al. | |
| 2014/0234283 A1 | 8/2014 | Jan | |
| 2018/0133953 A1 | 5/2018 | Achten et al. | |
| 2018/0264719 A1 | 9/2018 | Rolland et al. | |
| 2019/0047211 A1 | 2/2019 | Herring et al. | |
| 2020/0140707 A1 | 5/2020 | Achten et al. | |
| 2021/0032392 A1* | 2/2021 | Meisenheimer ... | C08G 18/1825 |
| 2021/0046696 A1 | 2/2021 | Achten et al. | |
| 2024/0409751 A1* | 12/2024 | Fischer ................ | C08G 18/722 |

FOREIGN PATENT DOCUMENTS

| | | |
|---|---|---|
| JP | 2003-534423 A | 11/2003 |
| JP | 2017-136403 A | 8/2017 |
| JP | 2019-503885 A | 2/2019 |
| JP | 2019-535554 A | 12/2019 |
| WO | 2018/104223 A1 | 6/2018 |
| WO | 2018/178025 A1 | 10/2018 |

OTHER PUBLICATIONS

Product Data Sheet for Desmodur N 31000, provided by Covestro. (Year: 2000).*
International Preliminary Report on Patentability received for PCT Patent Application No. PCT/EP2022/068143, mailed on Jan. 18, 2024, 7 pages.
European Search Report for EP Patent Application No. 21184735.5, Issued on Dec. 17, 2021, 7 pages.
International Search Report and Written Opinion received for PCT Patent Application No. PCT/EP2022/068143, mailed on Oct. 26, 2022, 9 pages.

* cited by examiner

*Primary Examiner* — Michael J Feely
(74) *Attorney, Agent, or Firm* — Faegre Drinker Biddle & Reath LLP

(57) ABSTRACT

A resin comprises: A) a multifunctional (meth)acrylate; B) an NCO-functional polyurethane; C) a radical starter and D) a catalyst. The multifunctional (meth)acrylate A) has a viscosity at 23° C. as determined according to DIN EN ISO 2884-1 of ≤10000 mPa·s, the NCO-functional polyurethane B) has an average NCO group functionality of ≥2 and an equivalent molecular weight with respect to NCO groups of >300 g/mol, the catalyst D) is an isocyanate trimerization catalyst and the resin is free from NCO-reactive compounds or, if NCO-reactive compounds are present in the resin, the molar ratio of NCO groups to NCO-reactive groups is ≥5:1.

15 Claims, 3 Drawing Sheets

PHOTO- AND THERMALLY CURABLE RESIN USEFUL IN ADDITIVE MANUFACTURING PROCESSES

CROSS-REFERENCE TO RELATED APPLICATIONS

Figure 1:
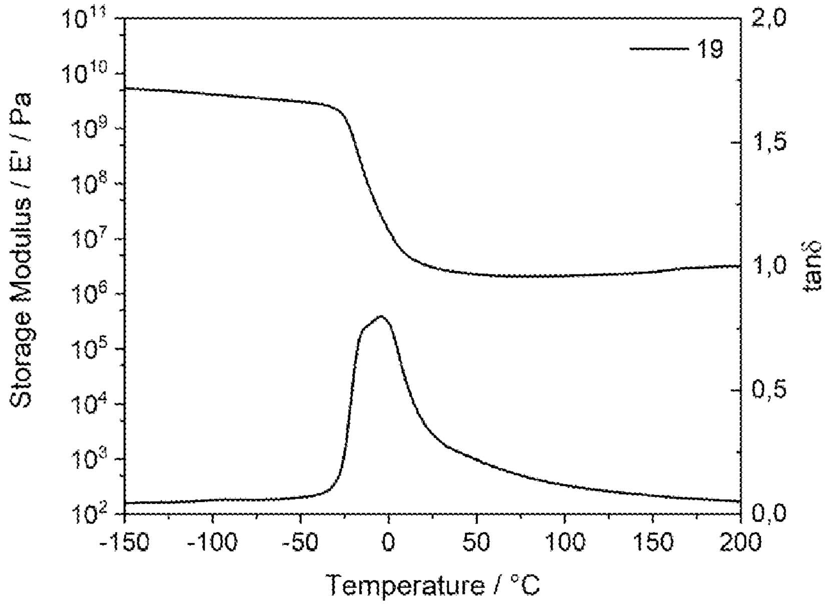

This application is a National stage application (under 35 U.S.C. § 371) of PCT/EP2022/068143, filed Jun. 30, 2022, which claims benefit of European Application No. 21184735.5, filed Jul. 9, 2021, both of which are incorporated herein by reference in their entirety.

The present invention relates to a resin comprising a (meth)acrylate-functional compound, an NCO-functional polyisocyanate, a radical starter and a catalyst. The invention also relates to a method of curing such a resin, cured resins and articles of manufacture.

The use of additive manufacturing build materials which are solely based on acrylates usually result in brittle material properties, which is undesired when it comes to the production of functional materials. Increasing the flexibility of cured build material resins is thus highly desired.

US 2018/264719 A1 relates to a method of forming a three-dimensional object, comprising: (a) providing a carrier and a fill level, and optionally an optically transparent member having a build surface defining said fill level, said carrier and said fill level having a build region therebetween; (b) mixing a first precursor liquid and a second precursor liquid to produce a polymerizable liquid comprising a mixture of (i) a light polymerizable liquid first component, and (ii) a second solidifiable component that is different from said first component, and wherein: (i') at least one reactant of said second solidifiable component is contained in said first precursor liquid, and (ii') at least one reactant or catalyst of said second solidifiable component is contained in said second precursor liquid; then (c) filling said build region with said polymerizable liquid; (d) irradiating said build region with light (through said optically transparent member when present) to form a solid polymer scaffold from said first component and also advancing said carrier away from said build surface to form a three-dimensional intermediate having the same shape as, or a shape to be imparted to, said three-dimensional object and containing said second solidifiable component carried in said scaffold in unsolidified and/or uncured form; (e) optionally washing said three-dimensional intermediate; and (f) concurrently with or subsequent to said irradiating step, solidifying and/or curing, said second solidifiable component in said three-dimensional intermediate to form said three-dimensional object, wherein said second solidifiable component comprises a polymerizable liquid solubilized in or suspended in said first component.

US 2018/133953 A1 discloses a process for producing an object from a precursor comprises the steps of: depositing a free-radically crosslinked resin atop a carrier to obtain a ply of a construction material joined to the carrier which corresponds to a first selected cross section of the precursor; depositing a free-radically crosslinked resin atop a previously applied ply of the construction material to obtain a further ply of the construction material which corresponds to a further selected cross section of the precursor and which is joined to the previously applied ply; repeating step II) until the precursor is formed; wherein the depositing of a free-radically crosslinked resin at least in step II) is effected by exposure and/or irradiation of a selected region of a free-radically crosslinkable resin corresponding to the respectively selected cross section of the object and wherein the free-radically crosslinkable resin has a viscosity (23° C., DIN EN ISO 2884-1) of ≥5 mPa·s to ≤100000 mPa·s. In the process the free-radically crosslinkable resin comprises a curable component in which NCO groups and olefinic C═C double bonds are present, wherein in the curable component the molar ratio of NCO groups to olefinic C═C double bonds is in a range from ≥1:5 to ≤5:1.

WO 2018/178025 A1 relates to a process for producing an article made of a build material, wherein the build material comprises free-radically crosslinkable groups, NCO groups and groups having Zerewitinoff-active H atoms and the article is a three-dimensional article and/or a layer. During and/or after production of the article the build material is heated to a temperature of ≥50° C. and the build material comprises one or more thermolatent tin compounds.

WO 2018/104223 A1 discloses a process for producing an object from a precursor, comprising the steps of: I) depositing a free-radically crosslinked resin atop a carrier to obtain a ply of a construction material joined to the carrier which corresponds to a first selected cross section of the precursor; II) depositing a free-radically crosslinked resin atop a previously applied ply of the construction material to obtain a further ply of the construction material which corresponds to a further selected cross section of the precursor and which is joined to the previously applied ply; III) repeating step II) until the precursor is formed. The depositing of a free-radically crosslinked resin at least in step II) is effected by introducing energy to a selected region of a free-radically crosslinkable resin corresponding to the respectively selected cross section of the object. The free-radically crosslinkable resin has a viscosity (23° C., DIN EN ISO 2884-1) of ≥5 mPa·s to ≤100 000 mPa·s. The free-radically crosslinkable resin comprises a curable component comprising NCO groups blocked with a blocking agent, compounds having at least two Zerewitinoff-active H atoms and olefinic C═C double bonds, wherein the blocking agent is an isocyanate or the blocking agent is selected such that deblocking of the NCO group is not followed by liberation of the blocking agent as a free molecule or as a part of other molecules or moieties. Step III) is followed by a further step IV): treating the precursor obtained after step III) under conditions sufficient for at least partially deblocking NCO groups present in the free-radically crosslinked resin of the obtained precursor and reacting the thus obtained functional groups with compounds having at least two Zerewitinoff-active H atoms to obtain the object.

US 2020/0140707 A1 relates to a method for producing an object in an additive manufacturing process from a precursor and comprises the following steps: I) depositing a layer of a radically cross-linkable construction material, which corresponds to a first selected cross-section of the precursor, on a carrier; II) depositing a layer of a radically cross-linkable construction material, which corresponds to a further selected cross-section of the precursor, on a previously applied layer of the radically cross-linked construction material; III) repeating step II) until the precursor is formed. The radically cross-linkable construction material comprises a thermoplastic radically cross-linkable polyurethane with a urethane group content of ≥5% by weight and a photoinitiator. The radically cross-linkable construction material is also heated to a processing temperature that is greater than the melting point of the radically cross-linkable polyurethane. After step III) the precursor having a temperature of 20° C. is defined as the object, or step IV) is performed: IV) performing a chemical reaction in the precursor obtained after step III) so that the object is obtained.

The present invention has the object of providing a resin that can be used in an additive manufacturing process which after curing has a higher flexibility than pure acrylate-based resins.

Accordingly a resin according to claim 1 is provided. A method of curing a resin according to claim 8, a photo-cured resin obtainable or obtained after step II) of the method is the subject of claim 13. A thermally cured resin obtainable or obtained after step III) of the method is the subject of claim 14 and an article of manufacture comprising a photo-cured resin and/or a thermally cured resin is the subject of claim 15.

The resin comprises: A) a multifunctional (meth)acrylate; B) an NCO-functional polyurethane; C) a radical starter and D) a catalyst. The multifunctional (meth)acrylate A) has a viscosity at 23° C. as determined according to DIN EN ISO 2884-1 of ≤10000 mPa·s, the NCO-functional polyurethane B) has an average NCO group functionality of ≥2 and an equivalent molecular weight with respect to NCO groups of >300 g/mol, the catalyst D) is an isocyanate trimerization catalyst and the resin is free from NCO-reactive compounds or, if NCO-reactive compounds are present in the resin, the molar ratio of NCO groups to NCO-reactive groups is ≥5:1.

Such resins have two curing pathways: a radiation-curing of (meth)acrylate groups and a thermally induced trimerization, in particular leading to isocyanurate formation, of NCO groups. Without wishing to be bound by theory it is assumed that after both curing pathways have been taken, combined networks have been formed where one network is derived from radiation-cured compound A) and the other network is derived from trimerized NCO-functional polyurethane B). The versatility of such combined networks lies in the synergistic behavior of the two different networks with regard to their mechanical properties.

In the radiation- and thermally cured resin according to the invention two overlapping glass transition temperatures may be observed. This may lead to only one apparent glass transition temperature being displayed in a DMA curve. However, a (meth)acrylic network in the dual polymer network can have a glass transition temperature of, for example, around 0° C. The second glass transition temperature results from the NCO group trimer network derived from NCO-functional polyurethanes and may, for example, also be around 0° C. This transition temperature may be tuned by the choice of any polyol in the compound B) as well as the molecular weight of B).

Cured materials based on the resins according to the invention display a higher elongation at break than comparable systems purely based on (meth)acrylates. These elongation at break values are understood as a proxy for the flexibility of the material. Moreover, the tensile strengths are higher for cured materials obtained from resins according to the invention than for pure (meth)acrylate systems. The combination of increased tensile strength and increased elongation results in an increase of the toughness. The combination of improved properties enables the use of the materials described as energy absorber or damping materials. Furthermore, without wishing to be bound by theory, it is envisaged that in at least some embodiments of the combined networks one network takes over the function that in other materials a solid filler would. Hence the need for solid fillers is obviated, making the recycling of the combined network material more feasible.

Multifunctional (meth)acrylates A) are such (meth)acrylates having, in the case of monomeric (meth)acrylates, two, three or more (meth)acrylate groups per molecule or, in the case of polymeric (meth)acrylates, an average of ≥1.5 and preferably ≥2 (meth)acrylate groups per molecule. Preferred multifunctional (meth)acrylates A) are 1.4-butanediol di(meth)acrylate, 1.3-butylene glycol di(meth)acrylate, diethylene glycol di(meth)acrylate, dipropylene glycol di(meth)acrylate, di-trimethylolpropane di(meth)acrylate, 1.6-hexandiol di(meth)acrylate, neopentyl glycol di(meth) acrylate, pentaerythritol tri(meth)acrylate, polyethylene glycol di(meth)acrylate, polypropylene glycol di(meth)acrylate, tetraethylene glycol di(meth)acrylate, triethylene glycol diacrylate, trimethylolpropane tri(meth)acrylate, tripropylene glycol di(meth)acrylate, polyester diol di(meth)acrylate, polycarbonate diol di(meth)acrylate, polyethylene glycol di(meth)acrylate, polyethylene triol tri(meth)acrylate, polypropylene triol tri(meth)acrylate, polyepoxide diacrylate and a mixture of at least two of the aforementioned substances.

It is provided that the NCO-functional polyurethane B) has an average NCO group functionality of ≥2 and an equivalent molecular weight with respect to NCO groups of >300 g/mol. Preferably the average NCO group functionality is ≥2 to ≤4 and more preferred ≥2 to ≤3. The equivalent molecular weight with respect to NCO groups is preferably ≥400 g/mol to ≤2000 g/mol and more preferred ≥600 g/mol to ≤1000 g/mol.

For the NCO-functional polyurethanes B) the equivalent molecular weight can be determined by first titrating, for example according to DIN EN ISO 14896, a sample in order to determine the NCO content, expressed as weight-percentage based on the total weight of the polyisocyanate ("% NCO"). The equivalent molecular weight of the polyisocyanate with respect to NCO groups is calculated by dividing the product of the molecular weight of an NCO group (42 g/mol) and a factor of 100 by the % NCO value.

The NCO-functional polyurethanes B) may be obtained from the reaction of a difunctional polyol with a large excess of diisocyanate. The molar ratio of NCO groups to NCO-reactive groups may be ≥5:1, or even ≥10:1.

Suitable diisocyanates are, for example, those having a molecular weight in the range from 140 to 400 g/mol and having aliphatically, cycloaliphatically, araliphatically and/or aromatically bonded isocyanate groups, for example 1.4-diisocyanatobutane (BDI), 1.5-diisocyanatopentane (PDI), 1.6-diisocyanatohexane (HDI), 2-methyl-1.5-diisocyanatopentane, 1.5-diisocyanato-2.2-dimethylpentane, 2.2,4- or 2.4,4-trimethyl-1.6-diisocyanatohexane, 1.10-diisocyanatodecane, 1.3- and 1.4-diisocyanatocyclohexane, 1.4-diisocyanato-3.3,5-trimethylcyclohexane, 1.3-diisocyanato-2-methylcyclohexane, 1.3-diisocyanato-4-methylcyclohexane, 1-isocyanato-3.3,5-trimethyl-5-isocyanatomethylcyclohexane (isophorone diisocyanate; IPDI), 1-isocyanato-1-methyl-4 (3)-isocyanatomethylcyclohexane, 2.4'- and 4.4'-diisocyanatodicyclohexylmethane (H12MDI), 1.3- and 1.4-bis(isocyanatomethyl)cyclohexane, bis(isocyanatomethyl) norbornane (NBDI), 4.4'-diisocyanato-3.3'-dimethyldicyclohexylmethane, 4.4'-diisocyanato-3.3',5.5'-tetramethyldicyclohexylmethane, 4.4'-diisocyanato-1.1'-bi(cyclohexyl), 4.4'-diisocyanato-3.3'-dimethyl-1.1'-bi(cyclohexyl), 4.4'-diisocyanato-2.2',5.5'-tetramethyl-1.1'-bi(cyclohexyl), 1.8-diisocyanato-p-menthane, 1.3-diisocyanatoadamantane, 1.3-dimethyl-5.7-diisocyanatoadamantane, 1.3- and 1.4-bis (isocyanatomethyl)benzene (xylylene diisocyanate; XDI), 1.3- and 1.4-bis(1-isocyanato-1-methylethyl)benzene (TMXDI) and bis(4-(1-isocyanato-1-methylethyl)phenyl) carbonate, 2.4- and 2.6-diisocyanatotoluene (TDI), 2.4'- and 4.4'-diisocyanatodiphenylmethane (MDI), 1.5-diisocyanatonaphthalene and any desired mixtures of such diisocyanates. Preferred are the non-aromatic diisocyanates, in particular PDI, IPDI, H12MDI and HDI.

Suitable polyols are preferably linear polyether polyols, polyester polyols, polyacrylate polyols, polyepoxide polyols or polycarbonate polyols. The molecular weight of the polyol can be 500 g/mol to 4000 g/mol, preferably 900 g/mol to 2500 g/mol.

The radical starter C) can be a thermal initiator and/or a photoinitiator. Examples for thermal initiators C) include azobisisobutyronitrile (AIBN), dibenzoyl peroxide (BPO), tert.-butyl hydroperoxide (TBHP), di-tert.-butyl peroxide (DTBP), cumyl peroxyneodecanoate, 2.2'-azobis(4-methoxy-2.4-dimethylvaleronitrile (V-70) and their mixtures.

Photoinitiators C) can be Norrish type I (cleavage), Norrish type II (abstraction) or cationic photoinitiators. Specific examples are Irgacur®500 (a mixture of benzophenone and (1-hydroxycyclohexyl)phenylketone), Irgacure®819 DW (phenylbis-(2,4,6-trimethylbenzoyl) phosphine oxide), Esacure® KIP EM (oligo-[2-hydroxy-2-methyl-1-[4-(1-methylvinyl)-phenyl]-propanones]) and Ivocerin® (bis(4-methoxybenzoyl) diethylgermanium). A preferred photoinitiator is 2-hydroxy-2-methylpropiophenone, commercially available as Omnirad® 1173. Another preferred photoinitiator system is a mixture commercially available as Omnirad® BL 750. Mixtures of the aforementioned photoinitiator compounds or systems may also be employed.

In the resin according to the invention the radical starter is generally employed in a concentration, based on the amount of employed curable component, of 0.01 to 6.0 weight-%, preferably of 0.5 to 4.0 weight-% and particularly preferably of 2.0 to 3.0 weight-%.

Isocyanate trimerization catalysts D) are, in principle, all compounds which accelerate the addition of isocyanate groups to afford isocyanurate groups and thus crosslink the isocyanate-containing molecules present. Specific examples are potassium acetate, potassium acetate in combination with a crown ether, potassium acetate in combination with a polyethylene glycol, potassium acetate in combination with a polypropylene glycol, tin ethylhexanoate, sodium phenoxide, potassium hydroxide, trioctyl phosphine and/or tributyltin oxide.

In the resin according to the invention the isocyanate trimerization catalyst can generally be employed in an amount, based on the NCO-functional polyurethane B), of 0.0005 to 5.0 weight-%, preferably of 0.1 to 2.0 weight-% and particularly preferably of 0.5 to 1 weight-%.

Preferably the photoinitiator C) selected is from: α-hydroxyphenylketones, benzildimethylketal, 2,4,6-trimethylbenzoyldiphenyl-phosphine oxide and/or bis(4-methoxybenzoyl)diethylgermanium and the catalyst D) is selected from: potassium acetate, potassium acetate in combination with a crown ether, potassium acetate in combination with a polyethylene glycol, potassium acetate in combination with a polypropylene glycol, tin ethylhexanoate, sodium phenoxide, potassium hydroxide, trioctyl phosphine and/or tributyltin oxide.

It is further provided that the resin is free from NCO-reactive compounds or, if NCO-reactive compounds are present in the resin, the molar ratio of NCO groups to NCO-reactive groups is ≥5:1. Such NCO-reactive compounds to be avoided include monoalcohols, polyols, monoamines and polyamines. The goal here should be to avoid the formation of a polyurethane or polyurea network as much as possible. "Free from" is to be understood as meaning that technically unavoidable traces are included, but no deliberate addition of such NCO-reactive compounds has taken place. If, for some reason, NCO-reactive compounds have to be present in the resin then the molar ratio of NCO groups to NCO reactive groups is preferably ≥10:1, more preferred ≥20:1 and most preferred ≥100:1.

In one embodiment the resin further comprises a monomeric mono(meth)acrylate. This serves as a reactive thinner. Preferred are isobornyl methacrylate (IBOMA), tetrahydrofuryl acrylate (THFA), isobutyl(meth)acrylate, n-butyl (meth)acrylate, isopropyl(meth)acrylate, n-propyl(meth) acrylate, ethyl(meth)acrylate, 2 ethyl-hexyl methacrylate or a mixture of at least two of the aforementioned substances.

In another embodiment the resin further comprises a second polyisocyanate with an average NCO group functionality of ≥2 and an equivalent molecular weight with respect to NCO groups of <300 g/mol. Examples are allophanates, biurets, uretdiones, isocyanurates, iminooxadiazinediones or a mixture of at least two of the aforementioned polyisocyanates. A particularly preferred second polyisocyanate is an allophanate having the following structure where o and p are, independently of each other, 4, 5 or 6 and where R is an alkyl rest having 1 to 6 carbon atoms:

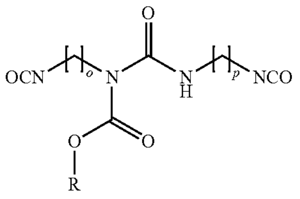

In another embodiment the multifunctional (meth)acrylate A) has a viscosity at 23° C. as determined according to DIN EN ISO 2884-1, of ≥1 mPa·s to ≤1000 mPa·s. Preferred viscosities are ≥5 mPa·s to ≤500 mPa·s.

In another embodiment the radical starter C) is present in an amount of ≤3 weight-%, based on the total weight of the acrylic phase and the catalyst D) is present in an amount of ≤1 weight-%, based on the weight of the polyisocyanate B).

In another embodiment the multifunctional (meth)acrylate A) and the NCO-functional polyurethane B) are present in a weight ratio between 2:1 and 1:3, based on the total weight of A) and B).

In another embodiment the isocyanate trimerization catalyst comprises tin (II) ethylhexanoate.

Another aspect of the invention is a method of curing a resin, comprising: I) providing a resin; II) generating radicals from radical starters present in the resin, thereby obtaining a radically cured resin and III) heating the radically cured resin of step II), thereby obtaining a thermally cured resin. In step I) the resin is a resin according to the invention, in step II) the radicals initiate a reaction between (meth) acrylate groups in the resin, in step III) the radically cured resin is heated to a temperature of ≥50° C., thereby initiating a trimerization reaction of isocyanate groups in the resin and steps II) and III) can take place simultaneously or subsequently.

Details regarding the resin according to the invention have already been given in the preceding sections of the specification and will not be repeated here in the interest of brevity.

The method according to the invention reflects the dual-cure approach where irradiation of the resin, thermally or by radiation (for example with infrared, visible or ultraviolet light), solidifies the liquid or plastic starting material under formation of a (meth)acrylate polymer network and thermally curing builds the isocyanurate network which results in combined networks. Temperatures in step III) are preferably ≥50° C. to ≤150° C. and more preferred ≥90° C. to ≤110° C. If a thermally induced radical curing of the resin is desired in step II), the temperatures in step II) are preferably ≥50° C. to ≤150° C. and more preferred ≥90° C. to ≤110° C. In the event that a subsequent execution of step II) as a thermally induced radical curing step followed by step III) is desired the temperature of step II) is lower than the temperature of step III).

An embodiment of the method with photochemical curing in step II) comprises: I) providing a resin; II) irradiating the resin, thereby obtaining a photo-cured resin and III) heating the photo-cured resin of step II), thereby obtaining a thermally cured resin. In step I) the resin is a resin according to the invention with the radical starter C) being a photoinitiator. In step II) irradiating the resin initiates a reaction between (meth)acrylate groups in the resin and in step III) the photo-cured resin is heated to a temperature of ≥50° C., thereby initiating a trimerization reaction of isocyanate groups in the resin.

In one embodiment in step I) the resin is provided as a coating on a substrate. The thermal curing step can then serve to harden shadow areas that have not been sufficiently irradiated with light.

In another embodiment in step II) the resin is selectively irradiated according to a pre-determined cross-section of a target article to be manufactured and the selective irradiation is repeated until a pre-determined intermediate article comprising the photo-cured resin is obtained and in step III) the intermediate article is heated to a temperature of ≥50° C., thereby obtaining the target article. This embodiment encompasses additive manufacturing processes such as stereolithography (SLA) and DLP. As the thermal curing step III) can take place outside of the SLA or DLP system the space-time-yield of finished products with respect to available number of SLA or DLP machines can be increased.

In another embodiment prior to step II) the resin is selectively applied onto a surface according to a pre-determined cross-section of a target article to be manufactured and the selective application and irradiation according to step II) is repeated until a pre-determined intermediate article comprising the photo-cured resin is obtained and in step III) the intermediate article is heated to a temperature of ≥50° C., thereby obtaining the target article. The surface can be a powder surface. Then the method according to this embodiment resembles a binder jetting process. Alternatively, the process can be a so-called photopolymer jetting process. As the application of the resin is selective, the irradiation in step II) does not need to be selective. The irradiation of the entire build platform would then be sufficient.

In another embodiment step III) is performed at a temperature of ≥80° C. to ≤120° C. for a time of ≥4 hours to ≤24 hours.

The invention is furthermore directed towards a photo-cured resin obtainable or obtained after step II) of a method according to the invention and towards a thermally cured resin obtainable or obtained after step III) of a method according to the invention.

A further aspect of the invention is an article of manufacture comprising a photo-cured resin according to the invention and/or a thermally cured resin according to the invention. Examples for such articles include medical devices, personalized medical articles, replicated medical implants, dental articles, sterilization containers and footwear components.

EXAMPLES

The present invention will be further described with reference to the following examples and figures without wishing to be limited by them. Comparative examples are designated as "(Comp.)"

Materials

Hexamethylene diisocyanate (HDI, NCO-content: 50%) and isophorone diisocyanate (IPDI, NCO-content: 37.62%), as well as the polyethercarbonate polyol (Polyol-1) were sourced form Covestro Deutschland AG.

The isocyanate Allo-1 was a low viscosity allophanate based on HDI with an isocyanate content of approx. 20.0% according to ISO 11909, a viscosity at 23° C. of approx. 500 mPa·s according to ISO 3219/A.3 and an isocyanate group functionality of approximately 2.5. The equivalent weight with respect to NCO groups was 210 g/mol.

Allo-1 was sourced from Covestro Deutschland AG and was used as received. Polytetra-hydrofurane (Polyol-2) was purchased from BASF. The photoinitiators Omnirad BL750 and Omnirad 1173 were sourced from IGM Resins. The inhibitor 2,5-bis(5-tert-butyl-2-benzoxazolyl)thiophene was purchased from sigma Aldrich and used as received. The (meth)acrylates mentioned below (IBOMA, DPGDA, THFA, PEGDA 700 g/mol) were purchased from sigma Aldrich and used as received.

The polyols used were:

| Polyol | Description |
|---|---|
| Polyol-1 | Linear polyethercarbonate diol, Mn = 1000 g/mol |
| Polyol-2 | Linear difunctional polytetrahydrofurane, Mn = 1000 g/mol |

The acrylates used were:

| Acrylate | Functionality | Viscosity [mPa · s] |
|---|---|---|
| Dipropyleneglycol diacrylate (DPGDA) | 2 | 15 |
| Isobornylmethacrylate (IBOMA) | 1 | 8 |
| Tetrahydrofurylacrylate (THFA) | 1 | 8 |
| Polyethyleneglycol diacrylate 700 g/mol (PEGDA700) | 2 | 110 |
| Polyurethane diacrylate as mentioned in tables 5 and 6 | 2 | 8000 |

Methods

Gel permeation chromatography (GPC) was performed according to DIN 55672-1:2016-03, on 4 PSS SDV Analytical columns using an Agilent 1100 Series pump and an Agilent 1200 Series UV Detector (230 nm) with tetrahydrofuran as the elution solvent at 40° C. and 1 mL/min.

Films were prepared on a Superfici Modulo UVM Plus machine, equipped with gallium- and mercury radiation sources with a total energy input of 1300 mJ/cm$^2$.

FTIR-spectra were measured on a Bruker FTIR Spectrometer Tensor II equipped with an ATR crystal.

Dynamic mechanical analysis of the cured films was performed on a Seiko SII Exstar 6100 DMS according to ISO 6721 with an oscillation frequency of 1 Hz. The experiments were carried out from −150° C. to 250° C. with a heating rate of 2 K/min. The glass transition temperature was determined by evaluation of the peak maximum in the loss factor curve tan δ.

Tensile tests were measured on a Zwick Retro with a 2 kN load cell, according to DIN EN ISO 527 at a test speed of 200 mm/min and a preload of 0.5 N. The E-modulus was determined between 0.05% and 0.025% elongation with a test speed of 1 mm/min.

Prints were performed on an ANYCUBIC PhotonS with a UV-LED light source of 405 nm. STL files were created using ANYCUBI Photon slicer. The layer thickness was 100 μm and the printing parameters were chosen according to the respective formulation (see table 5).

The NCO content was determined by titration. About 2.0 g of sample without isocyanate groups (blank sample) were added to 5.0 mL of a 0.1 M dibutyl amine solution in xylene followed by the addition of 50.0 mL of acetone and 3 drops of a phenol red solution (0.1 g in 80 g of a 20% ethanol in water mixture). This solution was then titrated with a 0.1 M hydrochloric acid solution to the color change and the consumption was recorded. NCO group-containing samples were treated accordingly. The NCO content "% NCO" was calculated according to:

$$\%\ \mathrm{NCO} = 4.2 * M * \frac{V_{blank} - V_{sample}}{m}$$

with M being the molarity of hydrochloric acid (e.g. 0.1 mol/L), m being the sample weight (g), $V_{blank}$ being the consumption of hydrochloric acid in the blank sample in mL and $V_{sample}$ being the consumption of hydrochloric acid in the sample in mL.

The NCO-terminated polyurethanes were prepared according to literature with slight modifications (Driest, P. J.; Dijkstra, D. J.; Stamatialis, D.; Grijpma, D. W., The Trimerization of Isocyanate-Functionalized Prepolymers: An Effective Method for Synthesizing Well-Defined Polymer Networks. *Macromolecular Rapid Communications* 2019, 40 (9), 1800867).

Generally, HDI or IPDI were heated to 100° C. under nitrogen atmosphere in a three-necked flask equipped with a stirrer, a condenser and a thermometer. 100 g of polymeric diol, buffered with 0.1 g dibutyl phosphate, were added dropwise to the HDI/IPDI in a molar ratio of 10:1/10:1 (NCO:OH). The reaction was allowed to take place for 3 h or until the desired isocyanate content was obtained, determined by titration. Subsequently, the product was transferred to a thin-film evaporator to remove excess HDI or IPDI at 140° C. or 150° C., respectively, and reduced pressure (typically 10-2 mbar). The HDI/IPDI monomer content was determined by GC.

The NCO-functional polyurethanes were obtained as clear and viscous resins. All polyurethanes were analyzed by GPC. The following table 1 gives data of the NCO-terminated polyurethanes ("ISO") synthesized and their corresponding viscosities measured according to DIN EN ISO 2884-1.

| | # | | |
|---|---|---|---|
| | ISO-1 | ISO-2 | ISO-3 |
| Isocyanate | HDI | HDI | IPDI |
| Polyol | Polyol-1 | Polyol-2 | Polyol-2 |
| Viscosity (23° C.) [mPa · s] | 5080 | Solid | 14600 |
| NCO-content [%] | 6.13 | 5.7 | 5.4 |
| EW* [g/mol] | 685 | 737 | 778 |
| Average NCO group functionality | 2 | 2 | 2 |

-continued

*equivalent molecular weight with respect to NCO groups

Results of curing of inventive formulations: Cured products based on acrylic and isocyanate-terminal precursors were prepared by mixing different amounts of an NCO-terminated polyurethane with low viscous (meth)acrylates, the photoinitiator (Omnirad 1173) as well as tin (II) ethylhexanoate as a trimerization catalyst. All samples were prepared by mixing the substances for two minutes. Subsequently, thin films were applied onto a glass substrate that has been pretreated with soy lecithin solution to facilitate removal, using a 400 μm doctor blade. These films were then cured under gallium and mercury irradiation with a total energy input of 1300 mJ·cm$^{-2}$. For thermal post-curing, the films were placed into the oven for 12 h at 100° C., until all isocyanate groups were converted, as determined by FTIR-spectroscopy. The present of isocyanates has been determined by IR-spectroscopy (2265 cm$^{-1}$). For prints, the photoinitiator was Omnirad BL 750 and additionally an inhibitor was added (<0.1 weight-%) in order to avoid dark curing and to increase build resolution.

3D prints were performed on an ANYCUBIC PhotonS with a UV-LED light source of 405 nm. STL files were created using ANYCUBI Photon slicer. The layer thickness was 100 μm and the printing parameters were chosen according to the respective formulation (see table 5).

Tables 1a and 1b show the results of inventive cured formulations 1-4.

Table 2 and 3 show the results of inventive and comparative example formulations.

Table 4 gives three examples that have been printed on a conventional DLP-printer.

Table 5 gives an example with a high molecular weight acrylate for comparison.

Table 6 gives more comparative examples which highlight the effect of a purely acrylic polymer network.

In all tables the "Elongation [%]" values are to be understood as elongation until break values. "n.d." stands for not determined, "n.a." stands for not applicable, for example when the sample did not lend itself to measuring a certain parameter.

TABLE 1a

| | # | |
|---|---|---|
| | 1 | 2 |
| ISO-1 [g] | 48.36 | 66.67 |
| DESMORAPID SO[g] | 0.37 | 0.51 |
| Omnirad 1173 [g] | 1.45 | 1.00 |
| DPGDA [g] | 24.18 | |
| IBOMA [g] | 24.18 | |
| THFA [g] | | 16.67 |
| PEGDA 700 [g] | | 16.67 |
| Tensile Strength [N/mm$^2$] | 13 | 5.1 |
| E-modulus [N/mm$^2$] | 275 | 69 |
| Elongation [%] | 65 | 187 |

TABLE 1b

| | # | |
|---|---|---|
| | 3 | 4 |
| ISO-2 [g] | 49.08 | |
| ISO-3 [g] | | 49.08 |
| DESMORAPID SO [g] | 0.37 | 0.37 |
| Omnirad 1173 [g] | 1.47 | 1.47 |
| THFA [g] | 24.54 | 24.54 |
| PEGDA 700 [g] | 24.54 | 24.54 |
| Tensile Strength [N/mm$^2$] | 14 | 2.9 |
| E-modulus [N/mm$^2$] | 46 | n.d. |
| Elongation [%] | 124 | 180 |

TABLE 2

| | # | | | | | | |
|---|---|---|---|---|---|---|---|
| | 5 (Comp.) | 6 | 7 | 8 | 9 | 10 | 11 |
| ISO-3 [g] | 65.79 | 65.79 | 65.79 | 65.79 | 65.79 | 65.79 | 65.79 |
| THFA [g] | 32.89 | 26.32 | 19.74 | 16.45 | 13.16 | 6.58 | |
| PEGDA 700 [g] | | 6.58 | 13.16 | 16.45 | 19.74 | 26.32 | 32.89 |
| Omnirad 1173 [g] | 0.99 | 0.99 | 0.99 | 0.99 | 0.99 | 0.99 | 0.99 |
| Desmorapid SO [g] | 0.33 | 0.33 | 0.33 | 0.33 | 0.33 | 0.33 | 0.33 |
| Tensile Strength [N/mm$^2$] | n.a. | n.d. | 1.8 | 2.7 | 6.4 | 9.4 | 10 |
| Elongation at Break [%] | n.a. | n.d. | 941 | 427 | 486 | 279 | 261 |

TABLE 3

| | # | | | | | | | |
|---|---|---|---|---|---|---|---|---|
| | 12 (Comp.) | 13 | 14 | 15 | 15a | 16 | 17 | 18 |
| ISO-3 [g] | 59.11 | 59.11 | 59.11 | 59.11 | 39.35 | 59.11 | 59.11 | 59.11 |
| Allo-1 [g] | | | | | 19.67 | | | |
| THFA [g] | 39.41 | 31.53 | 23.65 | 19.70 | 19.67 | 15.76 | 7.88 | |
| PEGDA 700 [g] | — | 7.88 | 15.76 | 19.70 | 19.67 | 23.65 | 31.53 | 39.41 |
| Omnirad 1173 [g] | 1.18 | 1.18 | 1.18 | 1.18 | 1.18 | 1.18 | 1.18 | 1.18 |
| Desmorapid SO [g] | 0.30 | 0.30 | 0.30 | 0.30 | 0.3 | 0.30 | 0.30 | 0.30 |
| Tensile Strength [N/mm$^2$] | n.a. | 1.1 | 2.6 | 2.1 | 3.6 | 4.2 | 5.5 | 4.5 |
| Elongation at Break | n.a. | 364 | 597 | 324 | 137 | 248 | 179 | 150 |

FIG. 1 shows E' and tan δ curves for the material obtained in example 19.

TABLE 4

| | # | | |
|---|---|---|---|
| | 19 | 20 | 21 |
| ISO-3 [g] | | 59.7 | 49.7 |
| ISO-1 [g] | 49.7 | | |
| THFA [g] | 24.9 | 23.9 | 24.9 |
| PEGDA 700 [g] | 24.9 | 15.9 | 24.9 |
| Omnirad BL 750 [g] | 0.25 | 0.2 | 0.25 |
| Desmorapid SO [g] | 0.25 | 0.3 | 0.25 |
| 2,5-bis(5-tert-butyl-2-benzoxazolyl)thiophene [g] | 0.025 | 0.02 | 0.025 |

TABLE 4-continued

| | # | | |
|---|---|---|---|
| | 19 | 20 | 21 |
| Tensile Strength [N/mm$^2$] | 2.7 | 2.5 | 4.5 |
| Elongation at Break | 76 | 287 | 148 |
| Printing Parameters | | | |
| Bottom Layers/Time [s] | 20 | 21 | 20 |
| No. of bottom layers | 3 | 3 | 3 |
| Model Layers/Time [s] | 16 | 17.5 | 15 |

TABLE 5

| | # 22 |
|---|---|
| ISO-3 [g] | 5 |
| DESMORAPID SO [g] | 0.038 |
| Omnirad 1173 [g] | 0.15 |
| PU-diacrylate*[g] | 24.54 |
| Tensile Strength [N/mm$^2$] | 1.3 |
| Elongation [%] | 118 |

*based on a polyether polyol and HDI, end-capped with hydroxyethylmethacrylate (HEMA); viscosity at 23° C. of 8000 mPa · s

TABLE 6

| | # | | | | | |
|---|---|---|---|---|---|---|
| | 23 (Comp.) | 24 (Comp.) | 25 (Comp.) | 26 (Comp.) | 27 (Comp.) | 28 (Comp.) |
| PEGDA 700 | 19.42 | 38.82 | 48.54 | 58.25 | 77.67 | |
| THFA | 77.67 | 58.25 | 48.54 | 38.83 | 19.42 | |
| PU-diacrylate | | | | | | 97.1 |
| Omnirad 1173 | 2.91 | 2.91 | 2.91 | 2.91 | 2.91 | 2.9 |
| Tensile Strength [N/mm$^2$] | 0.59 | 0.63 | 1.3 | n.a. | n.a. | 0.82 |
| Elongation [%] | 21 | 9 | 15.4 | n.a. | n.a. | 22.9 |

In examples 26 and 27 the samples broke upon measuring.

Figure 2:
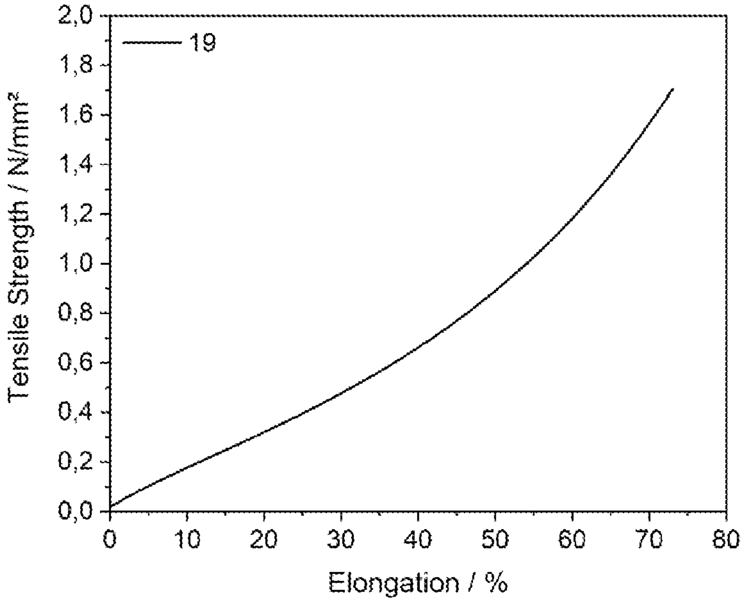
Figure 3:
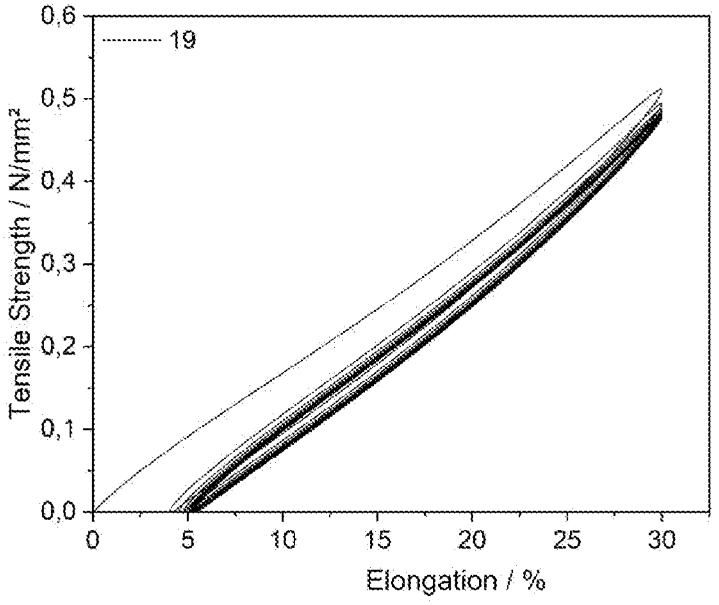

FIG. 1 shows a DMA curve of example 19. The material has a glass transition temperature at about 0° C. with a stable plateau modulus at higher temperatures with a storage modulus of 7.106 MPa. FIG. 2 gives the corresponding tensile curve, measured at 23° C. The sample shows high flexibility with elongations of more than 70%. The flexibility is further shown in FIG. 3. The hysteresis reveals a permanent deformation of only 5%, illustrating elastic behavior of the sample.

Figure 4:
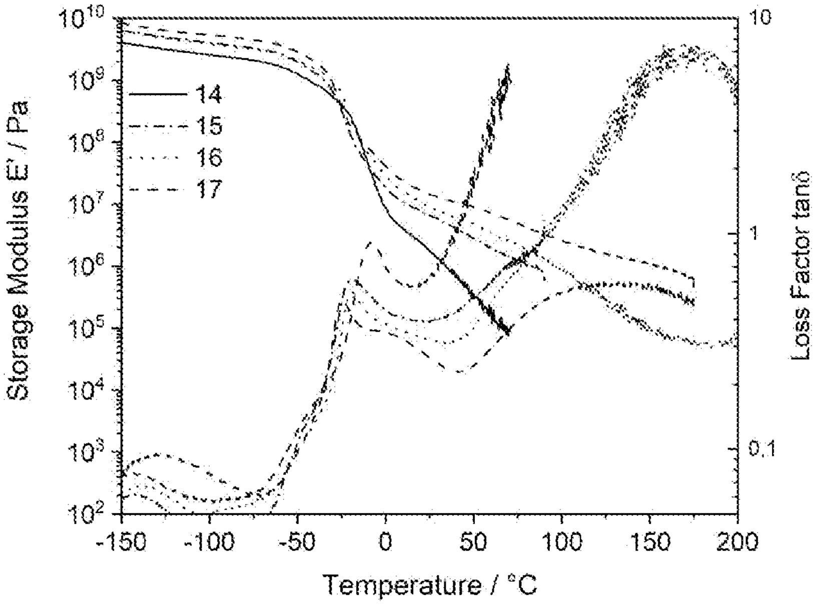
Figure 5:
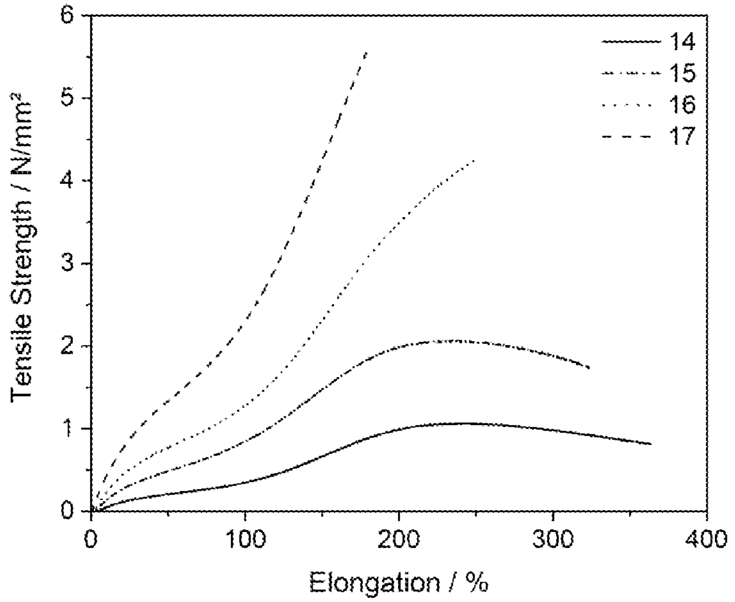
Figure 6:
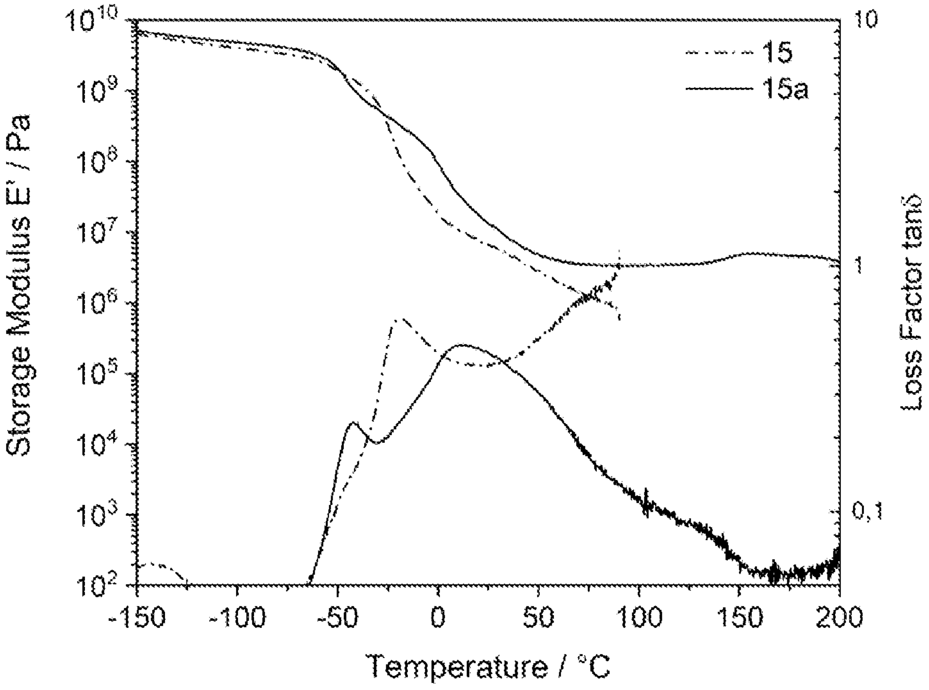

FIG. 4 shows a DMA curve of samples prepared with ISO-3 (examples 14 to 17). Being in the glass transition region at 23° C. the material shows high flexibility as proven in the tensile curves shown in FIG. 5. Lastly, FIG. 6 shows the effect of an additional polyisocyanate in examples 15 vs. 15a that increases the crosslinking density, resulting in a stable plateau modulus.

The invention claimed is:

1. A resin comprising:

A) a multifunctional (meth)acrylate

B) an NCO-functional polyurethane

C) a radical starter and

D) a catalyst wherein the multifunctional (meth)acrylate A) has a viscosity at 23° C. as determined according to DIN EN ISO 2884-1 of ≤10000 mPa·s, the NCO-functional polyurethane B) has an average NCO group functionality of ≥2 and an equivalent molecular weight with respect to NCO groups of >300 g/mol, the catalyst D) is an isocyanate trimerization catalyst and wherein the resin is free from NCO-reactive compounds or, if NCO-reactive compounds are present in the resin, the molar ratio of NCO groups to NCO-reactive groups is ≥5:1.

2. The resin according to claim 1, further comprising a monomeric mono(meth)acrylate.

3. The resin according to claim 1, further comprising a second polyisocyanate with an average NCO group functionality of ≥2 and an equivalent molecular weight with respect to NCO groups of <300 g/mol.

4. The resin according to claim 1, wherein the multifunctional (meth)acrylate A) has a viscosity at 23° C. as determined according to DIN EN ISO 2884-1, of ≥1 mPa·s to ≤1000 mPa·s.

5. The resin according to claim 1, wherein the radical starter C) is present in an amount of up to 3 weight-%, based on the total weight of the multifunctional (meth)acrylate A) and the catalyst D) is present in an amount of up to 1 weight-%, based on the weight of the NCO-functional polyurethane B).

6. The resin according to claim 1, wherein the multifunctional (meth)acrylate A) and the NCO-functional polyurethane B) are present in a weight ratio between 2:1 and 1:3, based on the total weight of A) and B).

7. The resin according to claim 1, wherein the isocyanate trimerization catalyst comprises tin (II) ethylhexanoate.

8. A method of curing a resin, comprising:

I) providing a resin;

II) generating radicals from radical starters present in the resin, thereby obtaining a radically cured resin and III) heating the radically cured resin of step II), thereby obtaining a thermally cured resin;

wherein in step I) the resin is a resin according to claim 1;

in step II) the radicals initiate a reaction between (meth) acrylate groups in the resin;

in step III) the radically cured resin is heated to a temperature of ≥50° C., thereby initiating a trimerization reaction of isocyanate groups in the resin and wherein steps II) and III) can take place simultaneously or subsequently.

9. The method according to claim 8, wherein in step I) the resin is provided as a coating on a substrate.

10. The method according to claim 8, wherein:

in step II) the resin is selectively irradiated according to a pre-determined cross-section of a target article to be manufactured and the selective irradiation is repeated until a pre-determined intermediate article comprising the photo-cured resin is obtained and in step III) the intermediate article is heated to a temperature of ≥50° C., thereby obtaining the target article.

11. The method according to claim 8, wherein:

prior to step II) the resin is selectively applied onto a surface according to a pre-determined cross-section of a target article to be manufactured and the selective application and irradiation according to step II) is repeated until a pre-determined intermediate article comprising the photo-cured resin is obtained and in step III) the intermediate article is heated to a temperature of ≥50° C., thereby obtaining the target article.

12. The method according to claim 8, wherein step III) is performed at a temperature of ≥80° C. to ≤120° C. for a time of ≥4 hours to ≤24 hours.

13. A photo-cured resin obtained after step II) of a method according to claim 8.

14. An article of manufacture comprising the photo-cured resin according to claim 13.

15. A thermally cured resin obtained after step III) of a method according to claim 8.

* * * * *